US012807849B2

(12) United States Patent
Kwon et al.

(10) Patent No.: US 12,807,849 B2
(45) Date of Patent: Nov. 24, 2026

(54) ADHESIVE COMPOSITION, ADHESIVE SHEET AND OPTICAL FILM

(71) Applicant: DONGWOO FINE-CHEM CO., LTD., Jeollabuk-do (KR)

(72) Inventors: Hye Rim Kwon, Incheon (KR); Geon Shin, Incheon (KR); Jong Min You, Gyeonggi-do (KR); Kyoung Moon Jung, Jeollanam-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 205 days.

(21) Appl. No.: 18/726,897

(22) PCT Filed: Jan. 2, 2023

(86) PCT No.: PCT/KR2023/000013
§ 371 (c)(1),
(2) Date: Jul. 5, 2024

(87) PCT Pub. No.: WO2023/132578
PCT Pub. Date: Jul. 13, 2023

(65) Prior Publication Data

US 2025/0092289 A1 Mar. 20, 2025

(30) Foreign Application Priority Data

Jan. 6, 2022 (KR) ........................ 10-2022-0002050
Jun. 21, 2022 (KR) ........................ 10-2022-0075844

(51) Int. Cl.
*C09J 133/08* (2006.01)
*B32B 7/12* (2006.01)
(Continued)

(52) U.S. Cl.
CPC ............... *C09J 133/08* (2013.01); *B32B 7/12* (2013.01); *B32B 23/04* (2013.01); *B32B 23/20* (2013.01);
(Continued)

(58) Field of Classification Search
CPC ... C09J 133/08; C09J 7/29; C09J 7/385; C09J 2433/00; C09J 2203/318; C09J 2301/302;
(Continued)

(56) References Cited

U.S. PATENT DOCUMENTS

| | | | |
|---|---|---|---|
| 4,983,715 A | 1/1991 | Miwa et al. | |
| 7,462,663 B2 * | 12/2008 | Kim ....................... | C09J 133/06 524/556 |
| 2018/0094173 A1 * | 4/2018 | Everaerts ............... | C09J 133/08 |

FOREIGN PATENT DOCUMENTS

| | | | |
|---|---|---|---|
| JP | 2006265349 A * | 10/2006 | ............... G02F 1/13 |
| JP | 2009-215528 A | 9/2009 | |

(Continued)

OTHER PUBLICATIONS

Machine Translation of JP 2013-047292 A (Year: 2026).*
(Continued)

*Primary Examiner* — Scott R. Walshon
(74) *Attorney, Agent, or Firm* — The PL Group, PLLC

(57) ABSTRACT

An adhesive composition includes an acrylic copolymer, a non-yellowing type isocyanate-based or aziridine-based crosslinking agent, and an organosilicon compound having at least two carbonyl groups. An adhesive layer formed from the adhesive composition may have high adhesiveness to the base film, and provide an optical film having improved reworkability even after being left for a long period of time under severe conditions such as high temperature/high humidity.

15 Claims, 1 Drawing Sheet

(51) Int. Cl.

| | |
|---|---|
| ***B32B 23/04*** | (2006.01) |
| ***B32B 23/20*** | (2006.01) |
| ***C08K 5/49*** | (2006.01) |
| ***C08K 5/544*** | (2006.01) |
| ***C08K 5/548*** | (2006.01) |
| ***C09J 7/29*** | (2018.01) |
| ***C09J 7/38*** | (2018.01) |

(52) U.S. Cl.
CPC ................. *C09J 7/29* (2018.01); *C09J 7/385* (2018.01); *B32B 2307/306* (2013.01); *B32B 2307/40* (2013.01); *B32B 2307/748* (2013.01); *B32B 2457/20* (2013.01); *C08K 5/49* (2013.01); *C08K 5/544* (2013.01); *C08K 5/548* (2013.01); *C09J 2433/00* (2013.01)

(58) Field of Classification Search
CPC ..... C09J 2301/408; C09J 133/04; B32B 7/12; B32B 23/04; B32B 23/20; B32B 2307/306; B32B 2307/40; B32B 2307/748; B32B 2457/20; C08K 5/49; C08K 5/544; C08K 5/548; C08K 5/00; G02B 1/11; G02F 1/1335; C09D 5/00
See application file for complete search history.

(56) References Cited

FOREIGN PATENT DOCUMENTS

| | | | | | |
|---|---|---|---|---|---|
| JP | 2013047292 A | * | 3/2013 | ............. | C09J 11/00 |
| JP | 2014-514387 A | | 6/2014 | | |
| JP | 2015-048481 A | | 3/2015 | | |
| JP | 2018-095742 A | | 6/2018 | | |
| JP | 2019189764 A | * | 10/2019 | ............ | C09J 133/08 |
| KR | 10-0840114 B1 | | 6/2008 | | |
| KR | 10-2010-0039274 A | | 4/2010 | | |
| KR | 10-2012-0137779 A | | 12/2012 | | |
| KR | 10-2014-0055795 A | | 5/2014 | | |
| KR | 10-2015-0025702 A | | 3/2015 | | |
| KR | 10-1625228 B1 | | 5/2016 | | |
| KR | 10-1628435 B1 | | 6/2016 | | |
| KR | 10-2018-0095687 A | | 8/2018 | | |
| KR | 10-2020-0090153 A | | 7/2020 | | |
| KR | 10-2021-0116446 A | | 9/2021 | | |
| WO | WO 2011/027707 A1 | | 3/2011 | | |

OTHER PUBLICATIONS

Machine Translation of KR 10-2015-0025702 (Year: 2026).*
Translation of JP-2019189764-A (Year: 2026).*
Translation of JP-2006265349-A (Year: 2026).*
International Search Report for PCT/KR2023/000013 mailed on Mar. 31, 2023.
Office action issued on May 21, 2024 from Korean Patent Office in a counterpart Korean Patent Application No. 10-2022-0075844 (all the cited references are listed in this IDS.) (English translation is also submitted herewith.).
Office action issued on Mar. 24, 2026 from Japan Intellectual Property Office in a counterpart Japanese Patent Application No. 2024-538992 (all the cited references are listed in this IDS.) (English translation is also submitted herewith.).

* cited by examiner

ADHESIVE COMPOSITION, ADHESIVE SHEET AND OPTICAL FILM

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2023/000013 filed on Jan. 2, 2023, which claims priority to the benefit of Korean Patent Application Nos. 10-2022-0002050 and Jan. 6, 2022 and 10-2022-0075844 filed on Jun. 21, 2022 in the Korean Intellectual Property Office, the entire contents of which are incorporated herein by reference.

BACKGROUND

1. Technical Field

The present invention relates to an adhesive composition, an adhesive sheet and an optical film. More specifically, the present invention relates to an adhesive composition including an acrylic copolymer, an adhesive sheet manufactured therefrom, and an optical film manufactured from the adhesive sheet.

2. Background Art

For example, in order to adhere a display panel of an image display device such as a liquid crystal display (LCD) device, an organic light emitting display (OLED) device, or the like with various optical structures or circuit structures, an adhesive or an adhesive sheet can be used. It is necessary for the adhesive to have improved transparency and excellent adhesion so as not to deteriorate optical properties of the image display device.

Recently, displays having high reliability even under severe high temperature and humid conditions or external physical impacts are being actively researched. Accordingly, a structure coupled to the display also needs to be formed so as to prevent the structure from falling-off or peeling-off despite the severe conditions and external impacts. Therefore, an adhesive or adhesive sheet capable of adhering the display structure while having high wettability and durability is required.

For example, Korean Patent Laid-Open Publication No. 2010-0039274 discloses an adhesive for a polarizing plate applied to the image display device. However, there is a limit in sufficiently securing the above-described characteristics required for a flexible display through the conventionally known adhesive.

SUMMARY

It is an object of the present invention to provide an adhesive composition capable of forming an adhesive layer with improved adhesive properties and reworkability.

It is another object of the present invention to provide an adhesive sheet including an adhesive layer formed using the adhesive composition and an optical film manufactured from the adhesive sheet.

1. An adhesive composition including: an acrylic copolymer; a non-yellowing type isocyanate-based or aziridine-based crosslinking agent; and an organosilicon compound having at least two carbonyl groups.

2. The adhesive composition according to the above 1, wherein the acrylic copolymer is formed from a polymerizable mixture including a (meth)acrylate monomer and a (meth)acrylic acid monomer.

3. The adhesive composition according to the above 2, wherein the polymerizable mixture further includes a polar functional group-containing crosslinkable monomer.

4. The adhesive composition according to the above 3, wherein the polar functional group of the polar functional group-containing crosslinkable monomer includes at least one of a hydroxy group, an amide group and an amine group.

5. The adhesive composition according to the above 3, wherein a content of the polar functional group-containing crosslinkable monomer is 0.1 to 5% by weight based on a total weight of the polymerizable mixture.

6. The adhesive composition according to the above 2, wherein the (meth)acrylate monomer includes a first monomer which is an alkyl (meth)acrylate monomer having 1 to 3 carbon atoms and a second monomer which is an alkyl (meth)acrylate monomer having 4 to 12 carbon atoms.

7. The adhesive composition according to the above 6, wherein a content of the first monomer is 10 to 40% by weight based on a total weight of the polymerizable mixture.

8. The adhesive composition according to the above 2, wherein a content of the (meth)acrylic acid monomer is 0.01 to 1% by weight based on the total weight of the polymerizable mixture.

9. The adhesive composition according to the above 1, wherein the organosilicon compound includes a nitrogen atom or a sulfur atom.

10. The adhesive composition according to the above 9, wherein the organosilicon compound includes an amine group or a sulfide group.

11. The adhesive composition according to the above 1, wherein the organosilicon compound has two carbonyl groups connected by a methylene group.

12. The adhesive composition according to the above 11, wherein the organosilicon compound has a malonyl group or an acetoacetyl group.

13. The adhesive composition according to the above 1, wherein the organosilicon compound includes a compound represented by Formula 1 below or Formula 2 below:

[Formula 1]

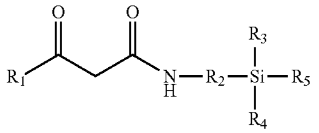

[Formula 2]

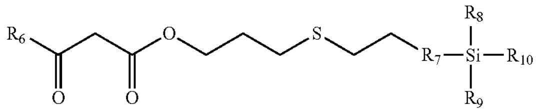

(wherein $R_1$ is an alkoxy group having 1 to 12 carbon atoms, $R_6$ is an alkyl group having 1 to 12 carbon atoms or an alkoxy group having 1 to 12 carbon atoms, and $R_2$ and $R_7$ are each independently a divalent aliphatic hydrocarbon group having 1 to 30 carbon atoms, and $R_3$ to $R_5$ and $R_8$ to $R_{10}$ are each independently hydrogen, an alkyl group having 1 to 12 carbon atoms, an alkenyl group having 2 to 12 carbon atoms, an alkynyl group having 2 to 12 carbon atoms, or an alkoxy group having 1 to 12 carbon atoms).

14. The adhesive composition according to the above 1, including: based on 100 parts by weight of the acrylic copolymer, 0.1 to 3 parts by weight of the non-yellowing type isocyanate-based or aziridine-based crosslinking agent; and 0.01 to 3 parts by weight of the organosilicon compound.

15. The adhesive composition according to the above 1, wherein the adhesive composition further includes an ionic antistatic agent.

16. An adhesive sheet including: a base film; and an adhesive layer disposed on the base film and formed using the adhesive composition according to the above 1.

17. The adhesive sheet according to the above 16, wherein an adhesion change ratio of the adhesive sheet according to Equation 2 below is 0.8 to 2.2:

$$\text{Adhesion change ratio} = P_H/P_C \qquad \text{[Equation 2]}$$

(in Equation 2, $P_C$ is an adhesion measured by attaching the adhesive sheet to an object to be adhered and leaving under conditions of a temperature of 23 °C and 50% RH for 24 hours, and then peeling-off the adhesive sheet from the object to be adhered at a speed of 300 mm/min and a peeling angle of 180 degrees, and $P_H$ is an adhesion measured by attaching the adhesive sheet to the object to be adhered and leaving under conditions of a temperature of 50 °C and 50% RH for 48 hours, and then peeling-off the adhesive sheet from the object to be adhered at a speed of 300 mm/min and a peeling angle of 180 degrees.

18. An optical film including: a base film; an adhesive layer disposed on an upper surface of the base film and formed using the adhesive composition according to the above 1; and an antireflective layer disposed on a lower surface of the base film.

19. An image display device including the optical film according to the above 18.

The adhesive composition according to exemplary embodiments may include an acrylic copolymer, an organosilicon compound having at least two carbonyl groups, and a non-yellowing type isocyanate-based or aziridine-based crosslinking agent. Accordingly, chemical stability and reworkability of the adhesive composition may be improved.

DETAILED DESCRIPTION

Figure 1:
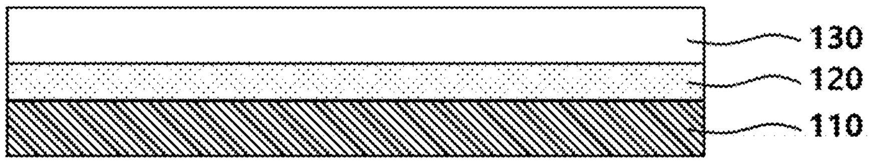
FIGS. 1 and 2 are schematic cross-sectional views for describing an adhesive sheet according to exemplary embodiments.

Embodiments of the present invention provide an adhesive composition including an acrylic copolymer, a non-yellowing type isocyanate-based or aziridine-based crosslinking agent, and an organosilicon compound having at least two carbonyl groups. In addition, there are provided an adhesive sheet including an adhesive layer formed from the adhesive composition and an optical film including the same.

Hereinafter, the present invention will be described in detail.

<Adhesive Composition>

The adhesive composition according to exemplary embodiments may include an acrylic copolymer. The acrylic copolymer may include a copolymer formed from a polymerizable mixture including a (meth)acrylate monomer and (meth)acrylic acid. As used herein, the term "(meth)acrylate" is used as a meaning of encompassing acrylate or methacrylate. As used herein, the term "(meth)acrylic acid" is used as a meaning of encompassing acrylic acid or methacrylic acid.

The (meth)acrylate monomer may include a first monomer which is alkyl (meth)acrylate having 1 to 3 carbon atoms and a second monomer which is alkyl (meth)acrylate having 4 to 12 carbon atoms.

The first monomer and the second monomer may be compounds derived from aliphatic alcohol having 1 to 12 carbon atoms.

Examples of the first monomer may include methyl (meth)acrylate, ethyl (meth)acrylate, propyl (meth)acrylate, etc., and preferably methyl (meth)acrylate. These may be used alone or in combination of two or more thereof.

In some embodiments, a content of the first monomer may be 10 to 40% by weight ("wt. %"), and preferably 15 to 35 wt. % based on a total weight of the polymerizable mixture. If the content of the first monomer is less than 10 wt. %, adhesion may not be sufficiently implemented. If the content of the first monomer exceeds 40 wt. %, adhesion may be excessively increased and reworkability may be reduced.

Examples of the second monomer may include n-butyl (meth)acrylate, 2-butyl (meth)acrylate, t-butyl (meth)acrylate, pentyl (meth)acrylate, octyl (meth)acrylate, 2-ethylhexyl (meth)acrylate, nonyl (meth)acrylate, decyl (meth) acrylate, lauryl (meth)acrylate, etc., and preferably, the second monomer includes n-butyl (meth)acrylate or 2-ethylhexyl (meth)acrylate. These may be used alone or in combination of two or more thereof.

In some embodiments, a content of the second monomer may be 60 to 89 wt. %, and preferably 65 to 80 wt. % based on the total weight of the polymerizable mixture. If the content of the first monomer is less than 60 wt. %, sufficient adhesion may not be implemented. Within the above range, it is possible to prevent a decrease in cohesion of the adhesive composition to cause a reduction in durability of the adhesive layer, and improve crosslinking density and adhesion of the adhesive layer.

According to exemplary embodiments, the polymerizable mixture includes both the first monomer and the second monomer, thereby preventing damage to a base material and residual adhesive material during rework while implementing improved adhesion.

The (meth)acrylic acid monomer may serve to provide adhesion to the adhesive composition. For example, when the acrylic copolymer has an acidic group derived from the (meth)acrylic acid monomer, adhesiveness and a degree of crosslinking of the adhesive composition may be improved.

However, as the content of (meth)acrylic acid monomer is increased, hydrophilicity of the adhesive composition may be increased, and surface transferability of an ionic antistatic agent which will be described below may be deteriorated. In addition, as the crosslinking agent which will be described below reacts with an acidic group derived from (meth)

acrylic acid to be consumed, the cohesion and adhesiveness of the adhesive layer may be decreased.

In some embodiments, a content of (meth)acrylic acid may be 1 wt. % or less based on the total weight of the polymerizable mixture. For example, the content of the (meth)acrylic acid monomer may be 0.01 to 1 wt. %, preferably 0.05 to 1 wt. %, and more preferably 0.05 to 0.5 wt. % based on the total weight of the polymerizable mixture. If the content of the (meth)acrylic acid monomer is less than 0.01 wt. %, the adhesion of the adhesive composition may be decreased. If the content of the (meth)acrylic acid monomer exceeds 1 wt. %, the adhesion may be excessively increased to cause a reduction in the reworkability, and may affect the transfer of the ionic antistatic agent to the surface, thereby resulting in a reduction in the durability.

According to exemplary embodiments, the polymerizable mixture may further include a polar functional group-containing crosslinkable monomer. For example, the acrylic copolymer may include a copolymer formed from a polymerizable mixture including a (meth)acrylate monomer, (meth)acrylic acid, and a crosslinkable monomer having a polar functional group.

The polar functional group-containing crosslinkable monomer may improve the degree of crosslinking of the acrylic copolymer. In addition, the polar functional group-containing crosslinkable monomer may react with a non-yellowing type isocyanate-based or aziridine-based crosslinking agent, which will be described below, to prevent cohesive destruction of the adhesive layer under high temperature/humidity conditions and provide adhesive strength.

The crosslinkable monomer may include a hydroxy group, an amide group and an amine group, etc. as a polar functional group. In some embodiments, the crosslinkable monomer may include a hydroxy group-containing monomer, an amide group-containing monomer, and/or an amine group-containing monomer. These may be used alone or in combination of two or more thereof.

Examples of the hydroxy group-containing monomer may include 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 2-hydroxyethylene glycol (meth)acrylate, 2-hydroxypropylene glycol (meth)acrylate, hydroxyalkylene glycol (meth)acrylate having 2-4 carbon atoms in an alkylene group, 4-hydroxybutyl vinyl ether, 5-hydroxypentyl vinyl ether, 6-hydroxyhexyl vinyl ether, 7-hydroxyheptyl vinyl ether, 8-hydroxyoctyl vinyl ether, 9-hydroxynonyl vinyl ether and 10-hydroxydecyl vinyl ether, etc. These may be used alone or in combination of two or more thereof.

Examples of the amide group-containing monomer may include (meth)acrylamide, N-isopropylacrylamide, N-tert-butylacrylamide, 3-hydroxypropyl (meth)acrylamide, 4-hydroxybutyl (meth)acrylamide, 6-hydroxyhexyl (meth)acrylamide, 8-hydroxyoctyl (meth)acrylamide, 2-hydroxyethylhexyl (meth)acrylamide, etc. These may be used alone or in combination of two or more thereof.

The amine group-containing monomer may include a tertiary amine group-containing monomer. Examples of the tertiary amine group-containing monomer may include N,N-(dimethylamino)ethyl(meth)acrylate, N,N-(diethylamino) ethyl(meth)acrylate, N,N-(dimethylamino)propyl (meth) acrylate, etc. These may be used alone or in combination of two or more thereof.

Preferably, the crosslinkable monomer may include 4-hydroxybutyl vinyl ether and/or (meth)acrylamide.

In some embodiments, a content of the crosslinkable monomer having a polar functional group may be 0.05 to 5 wt. %, and preferably 0.1 to 3 wt. % based on the total weight of the polymerizable mixture. If the content of the crosslinkable monomer is less than 0.05 wt. %, the cohesion of the adhesive composition may be decreased to cause a reduction in the durability. If the content of the crosslinkable monomer exceeds 5 wt. %, the adhesion and durability may be decreased as a gel fraction of the adhesive composition is excessively increased.

In some embodiments, the acrylic copolymer may further include other polymerizable monomers known in the art in addition to the above monomers within a range with no deterioration in adhesion, for example, in an amount of 10 wt. parts or less based on the total weight of the polymerizable mixture.

The method for preparing the acrylic copolymer is not particularly limited, and the acrylic copolymer may be prepared using methods commonly used in the art, such as bulk polymerization, solution polymerization, emulsion polymerization, suspension polymerization, etc., and solution polymerization method is preferably used. In addition, it is possible to further use solvents, polymerization initiators, chain transfer agents for controlling a molecular weight, or the like, commonly used in the polymerization.

In some embodiments, the acrylic copolymer may have a weight average molecular weight (in terms of polystyrene, Mw) of 50,000 to 2,000,000, and preferably 400,000 to 2,000,000. For example, the weight average molecular weight may be measured by gel permeation chromatography (GPC). If the weight average molecular weight of the acrylic copolymer is less than 50,000, cohesion between the copolymers may be insufficient to cause a reduction in the adhesive durability. If the weight average molecular weight thereof exceeds 2,000,000, it may need a great amount of diluted solvent in order to secure desired workability during coating.

The non-yellowing type isocyanate-based or aziridine-based crosslinking agent may serve to improve the cohesion, adhesiveness, and high-temperature reliability of the adhesive, and maintain the shape of the adhesive.

The yellowing type isocyanate-based crosslinking agent may refer to a compound in which carbons of phenyl group is directly linked to nitrogen atoms of isocyanate among the isocyanate-based crosslinking agents, and the non-yellowing type isocyanate-based crosslinking agent may refer to the remaining crosslinking agents except for the yellowing type isocyanate-based crosslinking agent among the isocyanate-based crosslinking agents.

A non-yellowing type isocyanate-based compound and an aziridine-based compound may have high reactivity with the polar functional group, and have improved adhesiveness to a base film subjected to corona discharge treatment or plasma treatment.

Examples of the isocyanate-based compounds include diisocyanate compounds such as xylene diisocyanate, hexamethylene diisocyanate, isophorone diisocyanate, tetramethylxylene diisocyanate, et.; polyfunctional isocyanate compounds containing three functional groups, such as an adduct product obtained by reacting 3 equivalents of a diisocyanate compound with 1 equivalent of a polyhydric alcohol compound such as trimethylolpropane, an isocyanurate product obtained by self-condensing 3 equivalents of a diisocyanate compound, a biuret product in which diisocyanate urea obtained from 2 equivalents among 3 equivalents of the diisocyanate compound is condensed with the remaining 1 equivalent of the diisocyanate compound, triphenylmethane triisocyanate, methylene bistriisocyanate, etc. These may be used alone or in combination of two or more thereof.

Examples of the aziridine-based compound may include pentaerythol-tris-(beta-(N-aziridinyl)propionate, trimethylolpropane-tris(beta-N-aziridinyl)propionate, trimethylolpropane tris(2-methyl-1-aziridinepropionate), N,N'-toluene-2,4-bis(1-aziridinecarboxamide), N,N'-diphenylmethane-4,4'-bis(1-aziridinecarboxamide), triethylene melamine, bisisoprotaloyl-1-(2-methylaziridine) or tri-1-aziridinylphosphine oxide, etc. These may be used alone or in combination of two or more thereof.

In some embodiments, a content of the crosslinking agent may be 0.1 to 3 parts by weight ("wt. parts"), and preferably 0.1 to 2 wt. parts based on 100 wt. parts of the acrylic copolymer. If the content of the crosslinking agent is less than 0.1 wt. parts, cohesion is decreased due to insufficient degree of crosslinking, such that adhesive durability and cutting ability may be reduced. If the content of the crosslinking agent exceeds 3 wt. parts, excessive crosslinking reaction may occur to cause an increase in the residual stress and a reduction in adhesiveness to an object to be adhered.

The adhesive composition according to exemplary embodiments may include an organosilicon compound having at least two carbonyl groups. In one embodiment, the organosilicon compound may include two carbonyl groups connected by a methylene group. Therefore, the adhesion of the adhesive composition may be increased by the organosilicon compound, and occurrences of bubbles, lifting, and breakage of the adhesive layer may be suppressed.

In some embodiments, the organosilicon compound may include a malonyl group or an acetoacetyl group. In this case, the adhesiveness of the adhesive composition may be further improved by the malonyl group or the acetoacetyl group, as well as heat resistance, and moisture-heat resistance may be improved.

In some embodiments, the organosilicon compound may have a nitrogen atom or a sulfur atom. For example, the organosilicon compound may include an amine group or a sulfide group. As the organosilicon compound has the amine group or the sulfide group together with the malonyl group or the acetoacetyl group, improved reworkability may be implemented even after being left for a long period of time under heat resistant and moisture-heat resistant conditions, and adhesive durability and adhesive reliability may be improved.

In some embodiments, the organosilicon compound may include a compound represented by Formula 1 or Formula 2 below.

[Formula 1]

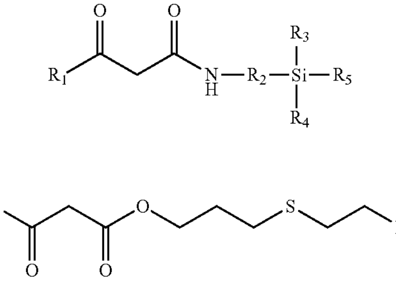

[Formula 2]

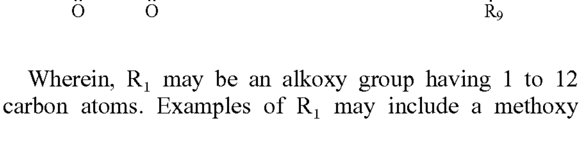

Wherein, $R_1$ may be an alkoxy group having 1 to 12 carbon atoms. Examples of $R_1$ may include a methoxy group, an ethoxy group, an isopropyloxy group, or the like, and preferably is a methoxy group in terms of reworkability.

$R_6$ may be an alkyl group having 1 to 12 carbon atoms or an alkoxy group having 1 to 12 carbon atoms. Examples of $R_6$ may include a methyl group, an ethyl group, an isopropyl group, a methoxy group, an ethoxy group, an isopropyloxy group, or the like, and preferably is a methyl group or methoxy group in terms of reworkability.

$R_2$ and $R_7$ may be each independently a divalent aliphatic hydrocarbon group having 1 to 30 carbon atoms. For example, $R_2$ and $R_7$ may be an alkylene group having 1 to 30 carbon atoms, an alkenylene group having 2 to 30 carbon atoms, or an alkynylene group having 2 to 30 carbon atoms.

$R_3$ to $R_5$ and $R_8$ to $R_{10}$ may be each independently hydrogen, an alkyl group having 1 to 12 carbon atoms, an alkenyl group having 2 to 12 carbon atoms, an alkynyl group having 2 to 12 carbon atoms, or an alkoxy group having 1 to 12 carbon atoms. At least one of the $R_3$ to $R_5$ and at least one of $R_8$ to $R_{10}$ are preferably an alkoxy group having 1 to 12 carbon atoms, and the number of carbon atoms may be adjusted in consideration of the relationship between adhesion and reworkability.

In some embodiments, the content of the organosilicon compound may be 0.01 to 3 wt. parts, preferably 0.1 to 2 wt. parts, and more preferably 0.1 to 1 wt. part based on 100 wt. parts of the acrylic copolymer. Within the above range, the durability and adhesiveness of the adhesive layer formed from the adhesive composition may be improved.

In some embodiments, the adhesive composition may further include an ionic antistatic agent. The ionic antistatic agent may include an ionic salt composed of an anion and a cation, and may impart ionic conductivity to the adhesive layer formed from the adhesive composition. For example, the adhesive layer may have a specific surface resistivity value of $10\times10^{10}\Omega/\square$ or less, and preferably $7\times10^{10}\Omega/\square$ or less.

In some embodiments, the ionic antistatic agent may include an alkali metal salt, an ionic liquid or ionic solid, and preferably an ionic solid.

When the ionic antistatic agent includes the ionic solid, stability against changes over time of the adhesive composition and durability of the adhesive layer may be improved. In addition, the ionic solid may have high compatibility with the above-described other components while maintaining transparency of the adhesive composition high.

In some embodiments, the ionic solid may have a melting point of 20 °C or higher, and specifically 20 to 50 °C. In this case, the mobility of the ionic solid may be minimized to improve the durability and reliability of the adhesive sheet or optical film. For example, when the melting point of the ionic solid is less than 20 °C, the mobility of the ionic solids is increased, such that the ionic solids may move to ends of the adhesive sheet or optical film to be eluted.

In some embodiments, the ionic solid may include $Cl^-$, $Br^-$, $I^-$, $AlCl_4^-$, $Al2Cl_7^-$, $BF_4^-$, $PF_6^-$, $ClO_4^-$, $NO_3^-$, $CO_3^{2-}$, $CH_3COO^-$, $CF_3COO^-$, $CH_3SO_3^-$, $CF_3SO_3^-$, $(FSO_2)_2N^-$, $(CF_3SO_2)_2N^-$, $(CF_3SO_2)_3C^-$, $AsF_6^-$, $SbF_6^-$, $NbF_6^-$, $TaF_6^-$, $F(HF)_n^-$, $(CN)_2N^-$, $C_4F_9SO_3^-$, $(C_2F_5SO_2)_2N^-$, $C_3F_7COO^-$, $C_6H_5COO^-$, $(CF_3SO_2)(CF_3CO)N^-$, $OTf^-$ (trifluoromethanesulfonate), $OTs^-$ (toluenesulfonate), $OMs^-$ (methanesulfonate) and/or $BPh_4^-$ (tetraphenylborate), etc.

In some embodiments, the ionic solid may include imidazolium, pyridinium, alkylammonium, alkylpyrrolidium, and/or alkylphosphonium, etc. as the cation.

In some embodiments, the content of the ionic antistatic agent may be 0.01 to 5 wt. parts based on 100 wt. parts of the acrylic copolymer. Within the above range, the durability of the adhesive layer may be maintained excellently while improving antistatic property of the adhesive layer.

The adhesive composition may further include common additives known in the art in order to control the adhesion, cohesion, viscosity, elastic modulus, glass transition temperature, and the like, which are required depending on uses thereof. For example, the adhesive composition may include a tackifier, an antioxidant, a corrosion-resistant agent, a leveling agent, a surface lubricant, dyes, pigments, a defoaming agent, a filler, a photo-stabilizer, a plasticizer, and the like as the additive.

<Adhesive Sheet>

Hereinafter, preferred embodiments of the present invention will be described in detail with reference to the accompanying drawings. However, since the drawings attached to the present disclosure are only given for illustrating one of several preferred embodiments of present invention to easily understand the technical spirit of the present invention with the above-described invention, it should not be construed as limited to such a description illustrated in the drawings.

FIG. 1 is a schematic cross-sectional view showing an adhesive sheet according to exemplary embodiments.

Referring to FIG. 1, the adhesive sheet according to exemplary embodiments may include a base film 110, an adhesive layer 120 disposed on an upper surface of the base film 110, and a release film 130 disposed on an upper surface of the adhesive layer 120.

The adhesive layer may be formed from the above-described adhesive composition. For example, the adhesive layer 120 may be formed by applying the adhesive composition including an acrylic copolymer, a non-yellowing type isocyanate-based or aziridine-based crosslinking agent, and an organosilicon compound having at least two carbonyl groups to the base film 110 and then curing the same.

In some embodiments, the base film 110 may include an acrylic resin, a cellulose resin, a polyolefin resin or polyester resin. In this case, the transparency, mechanical strength, thermal stability, moisture-shielding properties, isotropic properties, and the like of the base film 110 may be improved.

For example, the base film 110 may include an acrylic resin such as polymethyl (meth)acrylate, polyethyl (meth) acrylate, etc.; a polyester resin such as polyethylene terephthalate, polybutylene terephthalate, polyethylene isophthalate, polyethylene naphthalate, polybutylene naphthalate, etc.; a cellulose resin such as diacetylcellulose, triacetylcellulose, cellulose acetate butylene, etc.; a polyolefin resin such as polyethylene, polypropylene, cycloolefin, polyolefin having a norbornene structure, ethylene-propylene copolymer, etc.; a sulfonic resin, etc.; a polyether-etherketone resin, etc.; an allylate resin; or a mixture of the above resins.

In some embodiments, at least one surface of the base film 110, for example, a surface on which the adhesive layer 120 is formed, may be subjected to surface treatment. For example, corona discharge treatment, plasma treatment, blast treatment, primer treatment, etc. may be performed on one surface of the base film 110.

Derivatives of carboxylic acid (R—COOH) may be generated on the surface of the base film 110 due to the surface treatment. A carboxyl group of the carboxylic acid derivative may react with the adhesive composition, thereby the adhesiveness of the adhesive layer to the base film may be further improved.

In some embodiments, the surface of the base film 110 may not be subjected to saponification treatment. Since the base film used in the adhesive sheet has a hydrophobic surface, the adhesiveness and adhesion to the adhesive may be deteriorated. In this case, adhesiveness between the base material and the adhesive may be improved by performing a pretreatment process to saponify the surface of the base film by immersing it in an aqueous alkaline solution, forming a separate coating layer between the base film and the adhesive, or performing corona or plasma treatment on the surface of the base film.

However, when performing the saponification process or forming the separate coating layer, the yield and workability of the adhesive sheet may be decreased as the process becomes complicated, and contamination and quality deterioration of the adhesive sheet may occur due to the additional pretreatment or the process of forming the coating layer.

In the above-described adhesive composition according to the embodiments, an affinity between the surface of the base film 110 and the adhesive composition may be increased by the organosilicon compound having a malonyl group or an acetoacetyl group, thereby improving the adhesiveness of the adhesive layer 120 to the surface of the base film 110. In addition, heat resistance, and moisture-heat resistance, durability and adhesive reliability may be maintained under severe high temperature and humid conditions, and improved reworkability may be implemented even after being left for a long period of time in the severe conditions.

The adhesive layer 120 may be formed by applying the above-described adhesive composition to at least one surface of the base film 110, and then drying and/or curing the same. For example, the adhesive layer 120 may be formed by applying the adhesive composition to the base film 110 using a coating method such as roll coating, gravure coating, reverse coating, spray coating, air knife coating, die coater or the like.

According to exemplary embodiments, the adhesive layer 120 may have a gel fraction of 60 to 80%, and preferably 65 to 75%. The gel fraction of the adhesive layer 120 may be calculated using Equation 1 below.

$$\text{Gel fraction (\%)} = W2/W1 \times 100 \quad \text{[Equation 1]}$$

In Equation 1, W1 may be an initial weight of the adhesive layer. W2 may be a weight measured after immersing the adhesive layer in an ethyl acetate solution at room temperature for 3 days and drying the same at 120 °C for 24 hours.

If the gel fraction of the adhesive layer 120 is less than 60%, the durability and reworkability over time may be reduced due to a decrease in the degree of crosslinking and cohesion. If the gel fraction of the adhesive layer 120 exceeds 80%, the durability and adhesiveness of the adhesive layer 120 may be reduced due to excessive crosslinking, and damage to the object to be adhered may occur when peeling-off the adhesive sheet.

According to exemplary embodiments, an adhesion change ratio of the adhesive sheet according to Equation 2 below may be 0.8 to 2.2, and preferably 1.1 to 2.1. Within the above range, adhesive reliability at room temperature and high temperature may be secured while implementing the improved reworkability.

$$\text{Adhesion change ratio} = P_H/P_C \quad \text{[Equation 2]}$$

In Equation 2, $P_C$ may denote an adhesion measured by leaving an adhesive sheet under conditions of a temperature of 23 °C and 50% RH for 24 hours, and then peeling-off the adhesive sheet from the object to be adhered under the above conditions at a speed of 300 mm/min and a peeling angle of 180 degrees.

$P_H$ may denote an adhesion measured by leaving an adhesive sheet under conditions of a temperature of 50 °C and 50% RH for 48 hours, and then peeling-off the adhesive sheet from the object to be adhered under the above conditions at a speed of 300 mm/min and a peeling angle of 180 degrees.

The adhesion change ratio may represent a ratio of the adhesion at raised temperature (a temperature of about 50 °C) to the adhesion at room temperature (a temperature of about 23 °C), and may be used as a measure to determine reworkability after being left at raised temperature for a long period of time.

Referring to FIG. 1, the adhesive sheet may further include a release film 130 disposed on one surface of the adhesive layer 120. For example, the adhesive sheet may include the base film 110, the adhesive layer 120 and the release film 130, which are sequentially disposed in this order.

Figure 2:
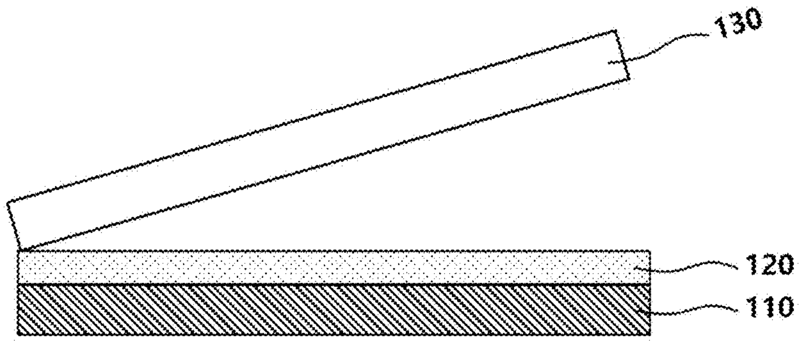

In some embodiments, the adhesive sheet may be provided in a form in which the base film 110 and the release film 130 are attached to both surfaces of the adhesive layer. Referring to FIG. 2, when using the adhesive sheet, the release film 130 may be removed from the adhesive sheet. In this case, the release film 130 may be removed from the adhesive sheet and the exposed adhesive layer 120 may be attached to the object to be adhered (e.g., a display panel).

In some embodiments, the adhesive sheet may be provided in a form in which the release films 130 are attached to both surfaces of the adhesive layer 120.

For example, a laminate may be formed by removing the release film 130 attached to one surface of the adhesive sheet, and attaching an optical base film 110 or functional layer (e.g., an antireflective layer) to the exposed surface of the adhesive layer 120.

In one embodiment, the antireflective layer may be provided as an antireflective plate attached to one surface of the optical base film 110, or may be adhered to the other surface of the optical base film 110 attached to the adhesive layer 120 of an adhesive sheet.

<Optical Film and Image Display Device>

Figure 3:
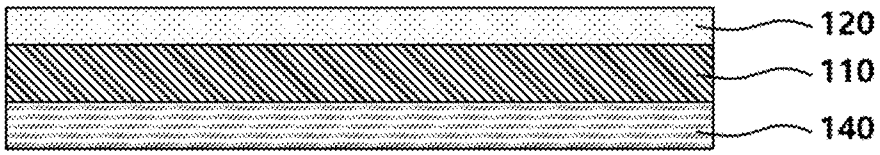
FIG. 3 is a schematic cross-sectional view for describing an optical film according to exemplary embodiments.

FIG. 3 a schematic cross-sectional view for describing an optical film according to exemplary embodiments.

Referring to FIG. 3, the optical film may include a base film 110, an adhesive layer 120 disposed on one surface of the base film 110, and an optical functional layer 140 disposed on the other surface of the base film 110.

For example, the optical film may be prepared by forming the optical functional layer 140 on one surface of the base film 110, and then applying the adhesive composition to the other surface of the base film 110 and curing the same to form the adhesive layer 120.

In some embodiments, the optical functional layer 140 may include an antireflective layer, a hard coating layer, a retardation layer, a polarizer and the like. For example, the optical film may be provided as an antireflective film, a hard coating film, a window film, a retardation film, a polarizing plate, and the like, depending on the optical functional layer 140.

In some embodiments, the optical film may further include a release film disposed on one surface of the adhesive layer 120. For example, the optical film may be provided in a form in which the base film 110 and the release film are attached to both surfaces of the adhesive layer 120. In this case, the release film formed on one surface of the adhesive layer 120 may be removed and the exposed surface of the adhesive layer 120 may be attached to the object to be adhered (e.g., the display panel).

In some embodiments, when the release films 130 are attached to both surfaces of the adhesive layer 120, the release film 130 on one surface of the adhesive layer 120 may be removed, and the optical functional layer 140 may be attached to the exposed surface. In addition, the release film 130 remaining on the other surface of the adhesive layer 120 may be additionally removed, and the object to be adhered (e.g., the display panel) may be attached to the exposed surface.

Figure 4:
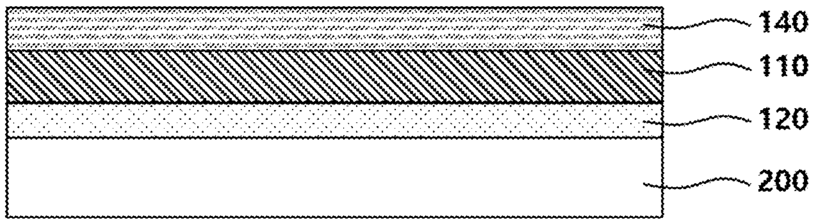
FIG. 4 is a schematic cross-sectional view for describing an image display device according to exemplary embodiments.

FIG. 4 is a schematic cross-sectional view for describing an image display device according to exemplary embodiments.

According to exemplary embodiments, the image display device may include a display panel 200 and an optical film disposed on the display panel 200.

In some embodiments, the image display device may include the display panel 200 and an optical film disposed on an upper surface of the display panel through the adhesive layer 120. For example, the image display device may be provided by removing the release film from the optical film and attaching the exposed adhesive layer 120 to the display panel 200.

The display panel 200 may be a liquid crystal display panel (LCD), an organic light emitting display panel (OLED), or a quantum dot light emitting display panel (QLED).

The image display device may further include other components known in the art in addition to the above-described components. For example, the image display device may further include a retardation film, a hard coating film, a protective film, a window film, a touch panel and the like. The components may be attached to each other using the adhesive composition according to exemplary embodiments.

As described above, the image display device may have improved durability and stability as adhesiveness and adhesion between the base film 110 and the adhesive layer 120 are improved. Therefore, the adhesive reliability of the image display device may be maintained for a long period of time even when a physical external force such as repeated bending is applied or under severe high temperature and humid conditions, and each component may be prevented from breaking, lifting and peeling-off.

In addition, when reworking after being left for a long period of time in the severe high temperature and humid conditions, the adhesive sheet may be peeled-off without damaging the object to be adhered or retaining the adhesive material.

Hereinafter, experimental examples including specific examples and comparative examples will be described to more concretely understand the present invention. However, those skilled in the art will appreciate that such examples are provided for illustrative purposes and do not limit subject matters to be protected as disclosed in appended claims. Therefore, it will be apparent to those skilled in the art various alterations and modifications of the embodiments are possible within the scope and spirit of the present invention and duly included within the range as defined by the appended claims.

PREPARATIVE EXAMPLES

Preparative Example 1: Preparation of Acrylic Copolymer (A-1)

100 wt. parts of a monomer mixture consisting of 68.8 wt. % of n-butylacrylate (BA), 30 wt. % of methacrylate (MA), 0.2 wt. % of acrylic acid (AA), and 1.0 wt. % of 2-hydroxyethyl methacrylate (2-HEMA) was introduced into 1 L reactor equipped with a cooling device for easy control of temperature, in which a nitrogen gas is refluxed. Then, 100 wt. parts of ethyl acetate (EA) as a solvent was introduced therein. Thereafter, nitrogen gas was introduced for 1 hour to remove oxygen and replaced therewith, then the temperature was maintained at 62 °C. The mixture was uniformly stirred, then 0.07 wt. parts of azobisisobutyronitrile (AIBN) as a reaction initiator was introduced into the reactor, followed by performing a reaction for 8 hours to prepare an acrylic copolymer (A-1) having a weight average molecular weight of about 1.24 million.

Preparative Example 2: Preparation of Acrylic Copolymer (A-2)

An acrylic copolymer (A-2) having a molecular weight of about 1.27 million was prepared according to the same procedures as described in Preparative Example 1, except that a monomer mixture consisting of 78.8 wt. % of n-butylacrylate (BA), 20 wt. % of methacrylate (MA), 0.2 wt. % of acrylic acid (AA), and 1.0 wt. % of 2-hydroxyethyl methacrylate (2-HEMA) was introduced into the reactor.

Preparative Example 3: Preparation of Acrylic Copolymer (A-3)

An acrylic copolymer (A-3) having a molecular weight of about 1.42 million was prepared according to the same procedures as described in Preparative Example 1, except that a monomer mixture consisting of 74 wt. % of n-butylacrylate (BA), 25 wt. % of methacrylate (MA), 0.3 wt. % of acrylic acid (AA), and 0.7 wt. % of 2-hydroxyethyl methacrylate (2-HEMA) was introduced into the reactor.

Preparative Example 4: Preparation of Acrylic Copolymer (A-4)

An acrylic copolymer (A-4) having a molecular weight of about 1.40 million was prepared according to the same procedures as described in Preparative Example 1, except that a monomer mixture consisting of 53.3 wt. % of n-butylacrylate (BA), 45 wt. % of methacrylate (MA), 0.2 wt. % of acrylic acid (AA), and 1.5 wt. % of 2-hydroxyethyl methacrylate (2-HEMA) was introduced into the reactor.

Preparative Example 5: Preparation of Acrylic Copolymer (A-5)

An acrylic copolymer (A-5) having a molecular weight of about 1.41 million was prepared according to the same procedures as described in Preparative Example 1, except that a monomer mixture consisting of 93.8 wt. % of n-butylacrylate (BA), 5 wt. % of methacrylate (MA), 0.2 wt. % of acrylic acid (AA), and 1.0 wt. % of 2-hydroxyethyl methacrylate (2-HEMA) was introduced into the reactor.

Preparative Example 6: Preparation of Acrylic Copolymer (A-6)

An acrylic copolymer (A-6) having a molecular weight of about 1.39 million was prepared according to the same procedures as described in Preparative Example 1, except that a monomer mixture consisting of 67.8 wt. % of n-butylacrylate (BA), 30 wt. % of methacrylate (MA), 1.2 wt. % of acrylic acid (AA), and 1.0 wt. % of 2-hydroxyethyl methacrylate (2-HEMA) was introduced into the reactor.

Preparative Example 7: Preparation of Acrylic Copolymer (A-7)

An acrylic copolymer (A-7) having a molecular weight of about 1.40 million was prepared according to the same procedures as described in Preparative Example 1, except that a monomer mixture consisting of 69 wt. % of n-butylacrylate (BA), 30 wt. % of methacrylate (MA), and 1.0 wt. % of 2-hydroxyethyl methacrylate (2-HEMA) was introduced into the reactor.

EXAMPLES (1) Preparation of Adhesive Composition

Adhesive compositions of examples and comparative examples were prepared by mixing the components and contents as shown in Table 1 below, and then diluting with ethyl acetate at a concentration of 20 wt. of solid content. At this time, the content is parts by weight.

(2) Manufacturing of Adhesive Sheet

Each prepared adhesive composition was applied to a release film coated with a silicone release agent and dried at 100 °C for 2 minutes to form an adhesive layer with a thickness of 20 μm. An adhesive sheet was manufactured by laminating a triacetyl cellulose (TAC) film subjected to corona discharge treatment on the formed adhesive layer.

TABLE 1

| | Adhesive composition | | | | | | |
|---|---|---|---|---|---|---|---|
| | Acrylic copolymer (A) | | Crosslinking agent (B) | | Organosilicon compound (C) | | Anti-static |
| Item (wt. parts) | Type | Content | Type | Content | Type | Content | agent (D) |
| Example 1 | (A-1) | 100 | (B-1) | 0.5 | (C-1) | 0.5 | 3 |
| Example 2 | (A-1) | 100 | (B-1) | 0.5 | (C-1) | 1 | 3 |
| Example 3 | (A-1) | 100 | (B-2) | 0.5 | (C-1) | 1.2 | 3 |
| Example 4 | (A-1) | 100 | (B-1) | 1.5 | (C-1) | 0.01 | 3 |
| Example 5 | (A-1) | 100 | (B-3) | 0.12 | (C-1) | 0.5 | 3 |
| Example 6 | (A-1) | 100 | (B-3) | 0.14 | (C-1) | 0.5 | 3 |
| Example 7 | (A-2) | 100 | (B-1) | 0.5 | (C-1) | 0.5 | 3 |
| Example 8 | (A-3) | 100 | (B-1) | 0.5 | (C-1) | 0.5 | 3 |
| Example 9 | (A-4) | 100 | (B-1) | 0.5 | (C-1) | 0.5 | 3 |
| Example 10 | (A-5) | 100 | (B-1) | 0.5 | (C-1) | 0.5 | 3 |
| Example 11 | (A-6) | 100 | (B-1) | 0.5 | (C-1) | 0.5 | 3 |
| Example 12 | (A-7) | 100 | (B-1) | 0.5 | (C-1) | 0.5 | 3 |
| Example 13 | (A-4) | 100 | (B-3) | 0.12 | (C-1) | 0.5 | 3 |
| Example 14 | (A-1) | 100 | (B-1) | 3.5 | (C-1) | 0.5 | 3 |
| Example 15 | (A-1) | 100 | (B-1) | 0.5 | (C-2) | 0.5 | 3 |
| Example 16 | (A-1) | 100 | (B-1) | 0.5 | (C-2) | 1 | 3 |
| Example 17 | (A-1) | 100 | (B-2) | 0.5 | (C-2) | 1.2 | 3 |
| Example 18 | (A-1) | 100 | (B-1) | 1.5 | (C-2) | 0.01 | 3 |
| Example 19 | (A-1) | 100 | (B-3) | 0.12 | (C-2) | 0.5 | 3 |
| Example 20 | (A-1) | 100 | (B-3) | 0.14 | (C-2) | 0.5 | 3 |
| Example 21 | (A-2) | 100 | (B-1) | 0.5 | (C-2) | 0.5 | 3 |
| Example 22 | (A-3) | 100 | (B-1) | 0.5 | (C-2) | 0.5 | 3 |
| Example 23 | (A-4) | 100 | (B-1) | 0.5 | (C-2) | 0.5 | 3 |
| Example 24 | (A-5) | 100 | (B-1) | 0.5 | (C-2) | 0.5 | 3 |
| Example 25 | (A-6) | 100 | (B-1) | 0.5 | (C-2) | 0.5 | 3 |
| Example 26 | (A-7) | 100 | (B-1) | 0.5 | (C-2) | 0.5 | 3 |

TABLE 1-continued

| Item (wt. parts) | Adhesive composition: Acrylic copolymer (A) Type | Content | Crosslinking agent (B) Type | Content | Organosilicon compound (C) Type | Content | Anti-static agent (D) |
|---|---|---|---|---|---|---|---|
| Example 27 | (A-4) | 100 | (B-3) | 0.12 | (C-2) | 0.5 | 3 |
| Example 28 | (A-1) | 100 | (B-1) | 3.5 | (C-2) | 0.5 | 3 |
| Comparative Example 1 | (A-1) | 100 | (B-1) | 0.5 | (C-3) | 0.5 | 3 |
| Comparative Example 2 | (A-1) | 100 | (B-3) | 0.3 | (C-3) | 0.5 | 3 |
| Comparative Example 3 | (A-1) | 100 | (B-4) | 0.5 | (C-1) | 0.5 | 3 |
| Comparative Example 4 | (A-1) | 100 | (B-4) | 0.5 | (C-2) | 0.5 | 3 |

The specific component names described in Table 1 above are as follows.

Acrylic Copolymer (A)

A-1: Copolymer prepared in Preparative Example 1 above

A-2: Copolymer prepared in Preparative Example 2 above

A-3: Copolymer prepared in Preparative Example 3 above

A-4: Copolymer prepared in Preparative Example 4 above

A-5: Copolymer prepared in Preparative Example 5 above

A-6: Copolymer prepared in Preparative Example 6 above

A-7: Copolymer prepared in Preparative Example 7 above

Crosslinking Agent (B)

B-1: D-110N (manufactured by Mitsui Chemicals)

B-2: Coronate-HXR (manufactured by Japan Polyurethane Industry)

B-3: CL-467 (manufactured by Menadiona)

B-4: Coronate-L (manufactured by Japan Polyurethane Industry)

Organosilicon Compound (C)

C-1: Compound represented by Formula 1-1 below

[Formula 1-1]

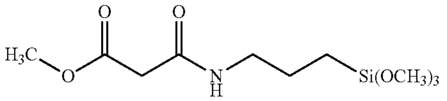

C-2: Compound represented by Formula 2-1 below

[Formula 2-1]

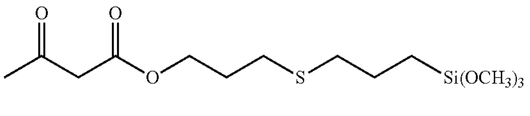

C-3: Compound represented by Formula 3 below

[Formula 3]

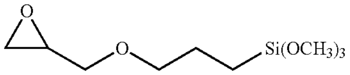

Antistatic Agent (D)

1-octyl-4-methylpyridinium hexafluorophosphate

EXPERIMENT EXAMPLE (1) Evaluation of Adhesion

Specimens were manufactured by cutting each prepared adhesive sheet into a size of 25 mm in length×100 mm in width and peeling-off the release film, then the exposed adhesive layer was attached to a glass substrate (#1737, manufactured by Corning) at a pressure of 0.25 MP, followed by autoclaving under conditions of a temperature of 50 °C and 5 atmospheres for 20 minutes.

To measure adhesion at room temperature, the prepared specimens were left under conditions of a temperature of 23 °C and 50% RH for 24 hours. Using a universal tensile tester (UTM, manufactured by Instron), the adhesion at room temperature was measured by peeling-off the adhesive sheet from the glass substrate at a peeling speed of 300 mm/min and a peeling angle of 180 degrees.

To measure adhesion at raised temperature, the prepared specimens were left under conditions of a temperature of 50 °C and 50% RH for 48 hours. Using a universal tensile tester (UTM, manufactured by Instron), the adhesion at room temperature was measured by peeling-off the adhesive sheet from the glass substrate at a peeling speed of 300 mm/min and a peeling angle of 180 degrees.

(2) Measurement of Reworkability

Specimens were manufactured by cutting each prepared adhesive sheet into a size of 25 mm in length×100 mm in width and peeling-off the release film, then the exposed adhesive layer was attached to a glass substrate at a pressure of 0.25 MPa, followed by autoclaving under conditions of a temperature of 50 °C and 5 atmospheres for 20 minutes.

To measure heat resistant reworkability, the prepared specimens were left in an oven at 80 °C for 10 hours, then taken out and stored at room temperature for 120 hours, and then the adhesive layer was peeled-off at a speed of 1.3 cm/sec.

To measure moisture-heat resistant reworkability, the prepared specimens were left in an oven at a temperature of 60 °C and 90% RH for 12 hours, then stored at room temperature for 120 hours, and then the adhesive layer was peeled-off at a speed of 1.3 cm/sec. The standards for evaluation are as follows.

<Standards for Evaluation>

○: There is no adhesive residue on the glass substrate and the base film (TAC film) is peeled-off cleanly without tearing in both heat resistant reworkability and moisture-heat resistant reworkability.

x: Adhesive remains on the glass substrate or the base film (TAC film) is torn during the peeling process in one or more of heat resistant reworkability and moisture-heat resistant reworkability.

(3) Evaluation of Durability (Heat Resistance, and Moisture-Heat Resistance)

Specimens were manufactured by cutting each prepared adhesive sheet into a size of 200 mm in length×100 mm in width and peeling-off the release film, then the exposed adhesive layer was attached to a glass substrate (210 mm×350 mm×0.7 mm), followed by autoclaving (50 °C×30 minutes at 0.5 MPa). At this time, the applied pressure was 5 kg/cm$^2$ and work performed in a clean room to prevent bubbles or foreign substances from occurring.

The heat resistance was evaluated by leaving the specimens at a temperature of 80 °C for 1000 hours and observing an occurrence of bubbles or peeling-off. The moisture-heat resistance was evaluated by leaving the specimens under conditions of 60 °C and 90% RH for 1000 hours and observing an occurrence of bubbles or peeling-off. At this time, immediately before evaluating the conditions of the specimens, these specimens were left at room temperature for 24 hours and observed. The standards for evaluation are as follows.

<Standards for Evaluation>

◎: No bubbles or peeling-off.

○: Bubbles or peeling-off<5

Δ: 5≤Bubbles or peeling-off<10 x: 10≤Bubbles or peeling-off (4) Measurement of Adhesiveness

Each prepared adhesive sheet was cut into a size of 25 mm in length×50 mm in width and attached to a SUS304 plate using a double-sided adhesive tape (width: 25 mm, Sookwang) on a surface of the TAC film. Thereafter, the surface of the adhesive layer was moved back and forth 20 times in a longitudinal direction (25 mm) at a pressure of 1 MPa and a speed of 0.1 m/s using an elastic rubber (Neoprene Rubber, Gouda). At this time, adhesiveness was determined by measuring a distance in which the adhesive layer was pushed on the TAC film. The standards for evaluation are as follows.

◎: Less than 10 mm

○: 10 mm or more but less than 15 mm

Δ: 15 mm or more but less than 20 mm x: 20 mm or more (5) Evaluation of Gel Fraction About 0.25 g of the adhesive layer of the adhesive sheet was attached to a 250 mesh woven steel wire mesh (100 mm×100 mm) and wrapped to prevent the gel fraction from leaking. After measuring a weight (B) by a precision balance, the steel wire mesh was immersed in an ethyl acetate solution for 3 days. The immersed steel wire mesh was taken out, washed with a small amount of ethyl acetate solution, dried at 120 °C for 24 hours, and then a weight (C) was measured. The gel fraction was calculated using the measured weights by Equation 1 below.

$$\text{Gel fraction (\%)} = (C-A)/(B-A)\times 100 \qquad \text{[Equation 1]}$$

In Equation 1, A means a weight of the steel wire mesh, B means a weight of the steel wire mesh attached with the adhesive layer, and C means a weight of the steel wire mesh dried after immersion. Therefore, (B−A) means an initial weight of the adhesive layer, and (C−A) means a weight of the gelled adhesive layer.

Evaluation results are shown in Table 2 below.

The adhesion ratio in Table 2 below means a ratio of the adhesion at raised temperature to the adhesion at room temperature.

TABLE 2

| | Adhesion (N/25 mm) | | | | Durability | | | |
|---|---|---|---|---|---|---|---|---|
| Item | Adhesion at room temperature | Adhesion at raised temperature | Adhesion ratio | Reworkability | Heat resistance | Moisture-heat resistance | Pushed distance (mm) | Gel fraction (%) |
| Example 1 | 3.8 | 4.9 | 1.3 | ○ | ◎ | ◎ | ○ | 73.2 |
| Example 2 | 5.4 | 6.5 | 1.2 | ○ | ◎ | ◎ | ○ | 74.8 |
| Example 3 | 3.1 | 6.5 | 2.1 | ○ | ◎ | ◎ | ○ | 71.5 |
| Example 4 | 2.1 | 3.2 | 1.5 | ○ | ◎ | ◎ | ◎ | 74.8 |
| Example 5 | 4.1 | 3.8 | 0.93 | ○ | ◎ | ◎ | ◎ | 69.7 |
| Example 6 | 3.8 | 4.2 | 1.1 | ○ | ◎ | ◎ | ◎ | 70.3 |
| Example 7 | 3.3 | 4.3 | 1.3 | ○ | ◎ | ○ | ○ | 75.2 |
| Example 8 | 3.6 | 5.8 | 1.6 | ○ | ◎ | ○ | ◎ | 73.8 |
| Example 9 | 9.5 | 15.2 | 1.6 | X | X | Δ | Δ | 69.5 |
| Example10 | 0.6 | 1.0 | 1.6 | ○ | X | Δ | Δ | 70.2 |
| Example11 | 3.8 | 4.7 | 1.2 | X | X | Δ | X | 76.2 |
| Example12 | 0.8 | 1.3 | 1.6 | ○ | X | Δ | X | 67.2 |
| Example13 | 11.2 | 16.8 | 1.5 | X | X | X | Δ | 69.5 |
| Example14 | 0.5 | 0.8 | 1.5 | ○ | X | X | X | 75.8 |
| Example15 | 3.7 | 4.4 | 1.2 | ○ | ◎ | ◎ | ○ | 71.8 |
| Example16 | 3.2 | 3.9 | 1.2 | ○ | ◎ | ◎ | ○ | 72.2 |
| Example17 | 2.9 | 3.5 | 1.2 | ○ | ◎ | ◎ | ○ | 73.1 |
| Example18 | 2.0 | 3.5 | 1.8 | ○ | ◎ | ◎ | ◎ | 72.3 |
| Example19 | 4.2 | 4.9 | 1.2 | ○ | ◎ | ◎ | ◎ | 73.2 |
| Example20 | 3.7 | 4.6 | 1.2 | ○ | ◎ | ◎ | ◎ | 70.9 |
| Example21 | 2.7 | 3.2 | 1.2 | ○ | ◎ | ○ | ○ | 74.2 |
| Example22 | 3.5 | 4.1 | 1.2 | ○ | ◎ | ○ | ◎ | 71.5 |
| Example23 | 8.9 | 14 | 1.6 | X | X | Δ | Δ | 72.8 |
| Example24 | 0.7 | 1 | 1.4 | ○ | X | Δ | Δ | 71.6 |
| Example25 | 3.8 | 4.4 | 1.2 | X | X | Δ | X | 72.8 |
| Example26 | 1.0 | 1.5 | 1.5 | ○ | X | Δ | X | 70.4 |
| Example27 | 10.8 | 16.5 | 1.5 | X | X | X | Δ | 73.5 |
| Example28 | 0.3 | 0.9 | 3.0 | ○ | X | X | X | 72.7 |
| Comparative Example 1 | 3.6 | 10.8 | 3 | X | Δ | X | ○ | 70.1 |
| Comparative Example 2 | 4.0 | 10.0 | 2.5 | X | Δ | X | ○ | 74.6 |
| Comparative Example 3 | 3.0 | 3.3 | 1.1 | X | ◎ | ○ | X | 74.6 |
| Comparative Example 4 | 2.9 | 3.2 | 1.1 | X | ◎ | ○ | X | 73.8 |

The above-described adhesive sheets according to embodiments may implement the improved reworkability even after being left for a long period of time while ensuring adhesiveness to the base film. Therefore, it can be confirmed that, as the organosilicon compound includes a malonyl group or an acetoacetyl group, and an amine group or a sulfide group, durability such as heat resistance, and heat-moisture resistance is improved. However, in the adhesive sheets of the comparative examples, it can be confirmed that the reworkability is significantly reduced after being left in a high temperature/humid environment for a long period of time, since the organosilicon compound does not have the malonyl group or the acetoacetyl group.

What is claimed is:

1. An adhesive composition comprising:

an acrylic copolymer;

a non-yellowing isocyanate-based or aziridine-based crosslinking agent; and an organosilicon compound having at least two carbonyl groups, wherein the acrylic copolymer is formed from a polymerizable mixture comprising a first monomer which is an alkyl (meth)acrylate monomer having 1 to 3 carbon atoms, a second monomer which is an alkyl (meth)

acrylate monomer having 4 to 12 carbon atoms, and a (meth)acrylic acid monomer, and a content of the first monomer is 15 to 35% by weight, a content of the second monomer is 60 to 89% by weight, and a content of the (meth)acrylic acid monomer is 0.01 to 1% by weight based on a total weight of the polymerizable mixture.

2. The adhesive composition according to claim 1, wherein the polymerizable mixture further comprises a polar functional group-containing crosslinkable monomer.

3. The adhesive composition according to claim 2, wherein the polar functional group of the polar functional group-containing crosslinkable monomer includes at least one of a hydroxy group, an amide group and an amine group.

4. The adhesive composition according to claim 2, wherein a content of the polar functional group-containing crosslinkable monomer is 0.1 to 5% by weight based on a total weight of the polymerizable mixture.

5. The adhesive composition according to claim 1, wherein the organosilicon compound includes a nitrogen atom or a sulfur atom.

6. The adhesive composition according to claim 5, wherein the organosilicon compound includes an amine group or a sulfide group.

7. The adhesive composition according to claim 1, wherein the organosilicon compound has two carbonyl groups connected by a methylene group.

8. The adhesive composition according to claim 7, wherein the organosilicon compound has a malonyl group or an acetoacetyl group.

9. The adhesive composition according to claim 1, wherein the organosilicon compound comprises a compound represented by Formula 1 below or Formula 2 below:

[Formula 1]

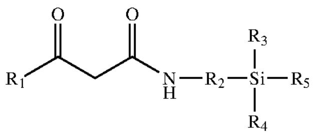

[Formula 2]

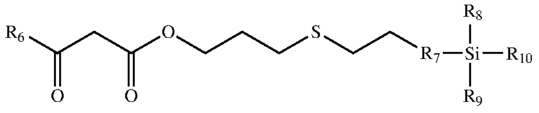

wherein, in Formula 1 and Formula 2 above, $R_1$ is an alkoxy group having 1 to 12 carbon atoms, $R_6$ is an alkyl group having 1 to 12 carbon atoms or an alkoxy group having 1 to 12 carbon atoms, and $R_2$ and $R_7$ are each independently a divalent aliphatic hydrocarbon group having 1 to 30 carbon atoms, and $R_3$ to $R_5$ and $R_8$ to $R_{10}$ are each independently hydrogen, an alkyl group having 1 to 12 carbon atoms, an alkenyl group having 2 to 12 carbon atoms, an alkynyl group having 2 to 12 carbon atoms, or an alkoxy group having 1 to 12 carbon atoms.

10. The adhesive composition according to claim 1, comprising:

based on 100 parts by weight of the acrylic copolymer, 0.1 to 3 parts by weight of the non-yellowing isocyanate-based or aziridine-based crosslinking agent; and 0.01 to 3 parts by weight of the organosilicon compound.

11. The adhesive composition according to claim 1, wherein the adhesive composition further comprises an ionic antistatic agent.

12. An adhesive sheet comprising:

a base film; and an adhesive layer disposed on the base film and formed using the adhesive composition according to claim 1.

13. The adhesive sheet according to claim 12, wherein an adhesion change ratio of the adhesive sheet according to Equation 2 below is 0.8 to 2.2:

$$\text{Adhesion change ratio} = P_H/P_C \qquad \text{[Equation 2]}$$

wherein, in Equation 2, $P_C$ is an adhesion measured by attaching the adhesive sheet to an object to be adhered and leaving under conditions of a temperature of 23 °C and 50% RH for 24 hours, and then peeling-off the adhesive sheet from the object to be adhered at a speed of 300 mm/min and a peeling angle of 180 degrees, and $P_H$ is an adhesion measured by attaching the adhesive sheet to the object to be adhered and leaving under conditions of a temperature of 50 °C and 50% RH for 48 hours, and then peeling-off the adhesive sheet from the object to be adhered at a speed of 300 mm/min and a peeling angle of 180 degrees.

14. An optical film comprising:

a base film;

an adhesive layer disposed on an upper surface of the base film and formed using the adhesive composition according to claim 1; and an antireflective layer disposed on a lower surface of the base film.

15. An image display device comprising the optical film according to claim 14.

* * * * *